(12) United States Patent
Lucas

(10) Patent No.: US 12,203,489 B2
(45) Date of Patent: Jan. 21, 2025

(54) LINEAR FAN INCLUDING WIRE SPRINGS

(71) Applicant: PERPETUA, INC., Liberty Lake, WA (US)

(72) Inventor: Timothy S. Lucas, Liberty Lake, WA (US)

(73) Assignee: NeoFan, Inc., Providence Forge, VA (US)

( * ) Notice: Subject to any disclaimer, the term of this patent is extended or adjusted under 35 U.S.C. 154(b) by 0 days.

(21) Appl. No.: 17/783,141

(22) PCT Filed: Dec. 2, 2020

(86) PCT No.: PCT/US2020/062856
§ 371 (c)(1),
(2) Date: Jun. 7, 2022

(87) PCT Pub. No.: WO2021/113336
PCT Pub. Date: Jun. 10, 2021

(65) Prior Publication Data
US 2023/0349396 A1 Nov. 2, 2023

Related U.S. Application Data

(60) Provisional application No. 62/943,604, filed on Dec. 4, 2019.

(51) Int. Cl.
*F04D 33/00* (2006.01)

(52) U.S. Cl.
CPC .................................. *F04D 33/00* (2013.01)

(58) Field of Classification Search
CPC ................................ F04D 33/00; F04D 35/00
See application file for complete search history.

(56) References Cited

U.S. PATENT DOCUMENTS

| 4,536,674 | A | * | 8/1985 | Schmidt | H02N 2/185 |
| | | | | | 310/330 |
| 4,595,338 | A | * | 6/1986 | Kolm | F04D 23/006 |
| | | | | | 310/330 |
| 4,780,062 | A | * | 10/1988 | Yamada | F04D 33/00 |
| | | | | | 417/410.2 |
| 10,954,932 | B2 | * | 3/2021 | Nguyen | F04B 45/041 |

(Continued)

FOREIGN PATENT DOCUMENTS

| EP | 4 069 979 A1 | 10/2022 |
| JP | 2002242898 A | 8/2002 |

(Continued)

OTHER PUBLICATIONS

Fang Sheng Huang et al; "Investigation of tuning-fork double piezoelectric fans with elastic base"; Applied Thermal Engineering; vol. 102, Jun. 5, 2016; pp. 760-769.

International Search Report and Written Opinion dated Mar. 11, 2021 issued by the International Searching Authority in related International Patent Application No. PCT/US2020/062856; filed Dec. 2, 2020.

(Continued)

*Primary Examiner* — Brian Christopher Delrue
(74) *Attorney, Agent, or Firm* — Gordon Rees Scully & Mansukhani, LLP (57) ABSTRACT

A linear fan blade assembly including a wire spring having a first end attached to a fan blade and a second end attached to a fan frame. The fan blade includes a free end such that the blade can oscillate by pivoting on the wire spring. The wire spring flexes to enable the fan blade to oscillate.

21 Claims, 8 Drawing Sheets

(56) References Cited

U.S. PATENT DOCUMENTS

| | | | | |
|---|---|---|---|---|
| 2002/0172597 | A1* | 11/2002 | Shiratori | A45B 27/00 |
| | | | | 416/70 A |
| 2005/0058559 | A1* | 3/2005 | Kasahara | F04D 27/008 |
| | | | | 417/423.1 |
| 2014/0169996 | A1* | 6/2014 | Tanaka | H10N 30/2042 |
| | | | | 417/410.2 |
| 2015/0152859 | A1* | 6/2015 | Tsai | F04D 33/00 |
| | | | | 416/3 |
| 2016/0252105 | A1 | 9/2016 | Lucas | |
| 2017/0254336 | A1* | 9/2017 | Nguyen | F04D 33/00 |
| 2019/0301442 | A1* | 10/2019 | Hao | H05K 7/20154 |
| 2020/0025217 | A1* | 1/2020 | Lucas | H02K 33/18 |
| 2020/0284249 | A1* | 9/2020 | Nguyen | F04B 45/047 |
| 2022/0168038 | A1* | 6/2022 | Shelton, IV | A61B 17/0682 |
| 2023/0349396 | A1 | 11/2023 | Lucas | |

FOREIGN PATENT DOCUMENTS

| | | | |
|---|---|---|---|
| JP | 3904240 B2 * | 4/2007 | H01L 41/0973 |
| JP | 2014-013000 A | 1/2014 | |
| WO | 2018-125719 A1 | 7/2018 | |
| WO | 2021113336 A1 | 6/2021 | |

OTHER PUBLICATIONS

Extended European Search Report dated Nov. 24, 2023 issued by the European Patent Office in related European Application No. 20897460.0.

Canadian Office Action and Examination Search Report dated Apr. 23, 2024 issued by the Canadian Intellectual Property Office in related Canadian Patent Application No. 3,166,376.

* cited by examiner

LINEAR FAN INCLUDING WIRE SPRINGS

CROSS REFERENCE TO RELATED APPLICATION

This application claims priority to and the benefit of U.S. Provisional Patent Application No. 62/943,604 filed on Dec. 4, 2019. The foregoing provisional patent application is incorporated by reference herein in its entirety.

BACKGROUND

This application relates to fan technology for use in forced-air thermal management systems and in particular for forced air thermal management systems in hot harsh environments and for general-purpose fan applications.

Rotary fan-driven forced-air heat transfer systems are the most prevalent thermal management solution for electronics cooling. Recently, markets such as automotive, autonomous vehicles, telecom, outdoor electronics enclosures, military, aerospace, energy and LED lighting applications are pushing electronics products into increasingly hot and harsh environments, which can significantly degrade fan life since bearing lubricants evaporate exponentially faster as operating temperatures increase. In harsh environments, bearings can also aspirate atmospheric contaminants causing degradation of lubricants, thereby further reducing fan life.

Since linear fans (e.g. cantilever fans) move air via an oscillating blade which pivots on a spring, they do not require bearings and thus their life expectancy is not affected by temperature or degradation of lubricants. So called "infinite life" can be achieved for linear fans using pivot springs made of ferrous metals if the spring's peak bending stress is less than the material's fatigue limit. However, steel sheet metal pivot springs have proven problematic and as such have not seen commercial success.

Figure 1:
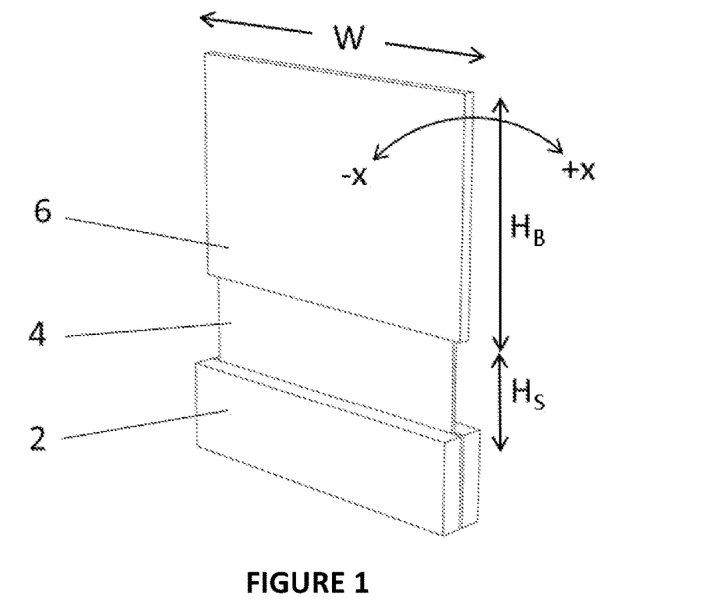
FIG. 1 is a perspective view of fan blade assembly employing a sheet metal spring.

A typical prior art linear fan architecture is illustrated in FIG. 1, comprising spring clamp blocks 2, sheet metal spring 4 and rigid fan blade 6. Blade 6 oscillates back and forth by pivoting on sheet metal spring 4 which bends to accommodate the blade oscillation. This architecture consisting of a rigid blade pivoting on a bending spring is essential for the dynamic stability needed for commercially viable linear fans.

To create air flow, the blade must oscillate in its fundamental pivot mode in the ±x direction, as indicated by the curved arrow in FIG. 1. If the blade assembly is excited in higher oscillation modes, then those higher mode oscillations are superimposed on the fundamental oscillation causing dynamic instabilities of the blade, premature spring failure due to high spring stresses and excessive noise.

For the architecture shown in FIG. 1, the larger the ratio of blade height $H_B$ to spring height $H_S$ then the greater the dynamic stability of the blade assembly. The larger the $H_B/H_S$ ratio, the more the blade behaves dynamically like a simple panel on a hinge. Compared to a full cantilever blade that is free to bend along its entire height, the FIG. 1 architecture with high $H_B/H_S$ ratios will greatly reduce the number of unwanted higher resonant modes that lead to dynamic instabilities and will also increase the frequency separation between those higher modes and fundamental pivot mode. These advantages will be recognized as long as the spring does not introduce its own instabilities to the blade assembly.

While in theory the blade assembly architecture of FIG. 1 appears to provide high stability, in practice the use of sheet metal pivot springs introduces instabilities that prevent the blade assembly from being commercially viable. The different materials required for each component will have different coefficient of thermal expansion (CTE) values. Consequently, as temperatures change during operation, the CTE mismatches will cause the sheet metal spring to distort resulting in (1) cyclic changes in spring stiffness, (2) consequent dynamic instabilities, (3) stress risers that exceed the spring's fatigue limit making commercially relevant fan life unachievable and (4) commercially unacceptable noise levels resulting from cyclic snap-throughs in the sheet metal spring. Referring to FIG. 1, these CTE mismatches are problematic at any blade width W, but the CTE induced component distortions obviously become proportionately more severe as blade width W increases.

A further disadvantage of the inclusion of the sheet metal springs in the architecture of FIG. 1, is that linear fans must run at or near their mass-spring resonant frequency in order to operate with acceptable energy efficiency and large spring K (stiffness) values are required to provide resonant frequencies high enough for useful air flow rates. Within the short heights $H_S$ required for dynamic blade stability, sheet metal springs cannot provide spring K values large enough for commercially relevant flow rates without exceeding the fatigue limit of the springs, resulting in rapid fan failure.

A still further disadvantage of sheet metal springs is that once the material is cut to size for an application, the cut edges that undergo repetitive bending in the application must first undergo an edge finishing operation to eliminate burs and cracks that cause stress risers. These stress risers can lead to crack propagation failure of the spring at spring bending stresses far below the material's certified fatigue limit. Regardless of the quality and material properties of the sheet metal created at the mill, its life and reliability are only as good as the secondary edge finishing operation.

Consequently, for linear fans of any width W to achieve commercial viability, a pivot spring is needed that can absorb the different dimensional changes of the blade assembly components due to practical CTE mismatches while also providing the large spring K values needed for commercially useful air flow rates without spring failure or without disrupting the inherent dynamic stability of the FIG. 1 architecture.

To satisfy the current unmet market need for extended fan life in hot harsh environments, the present invention is directed to a fan that includes wire springs to overcome the aforementioned limitations of the prior art sheet metal springs.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

The embodiments described herein relate to a linear fan that may include a linear blade assembly that includes a linear oscillating fan blade and a spring. As described further below, the linear oscillating fan blade may be driven by an electromagnetic motor, for example.

Figure 2:
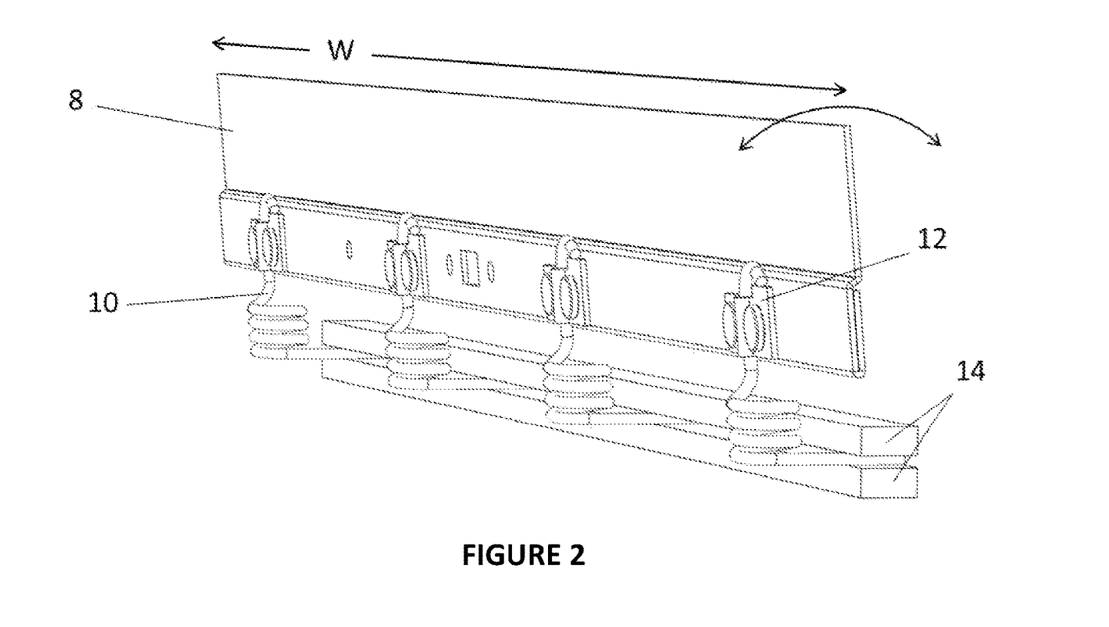
FIG. 2 is a perspective view of an exemplary embodiment of a fan blade assembly including wire springs.
Figure 3:
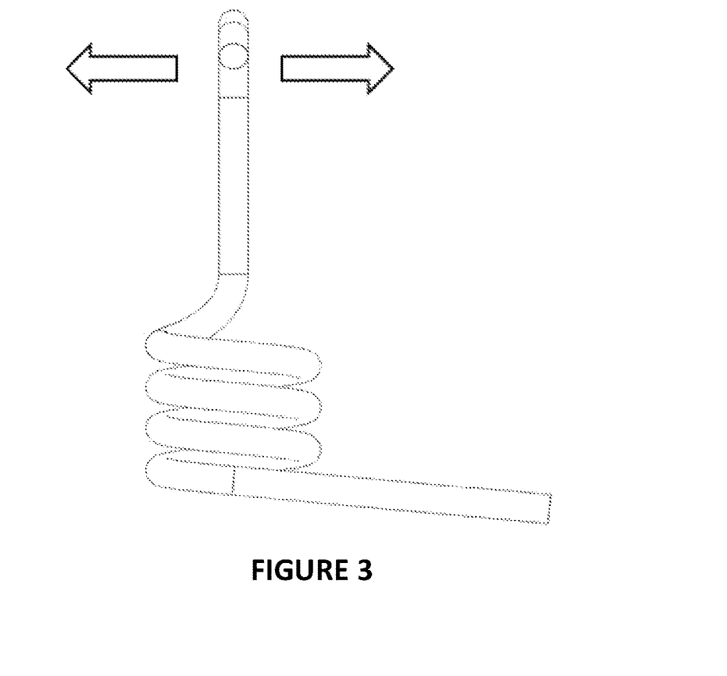
FIG. 3 is a side view of a coil spring employed in the assembly of FIG. 2.

FIG. 2 illustrates an exemplary embodiment of a linear fan blade assembly including a plurality of wire coil springs 10 having a vertical orientation and being rigidly attached to the fan blade 8 by brackets 12 with the other end of springs 10 being attached to stationary clamp blocks 14. Although four springs are illustrated, other embodiments may include one or more coil springs depending on the dimensions of the fan and the application in which the fan is being employed. Springs 10 allow blade 8 to pivot and oscillate as indicated by the curved arrow. Springs 10 have a pitch like compression springs, but unlike compression springs, springs 10 bend in a lateral mode as shown in FIG. 3. The spring 10 is configured with a coil pitch large enough to prevent contact between the coil turns during lateral bending, which would create instabilities, stress risers, surface damage, premature spring failure and significant noise.

Figure 4:
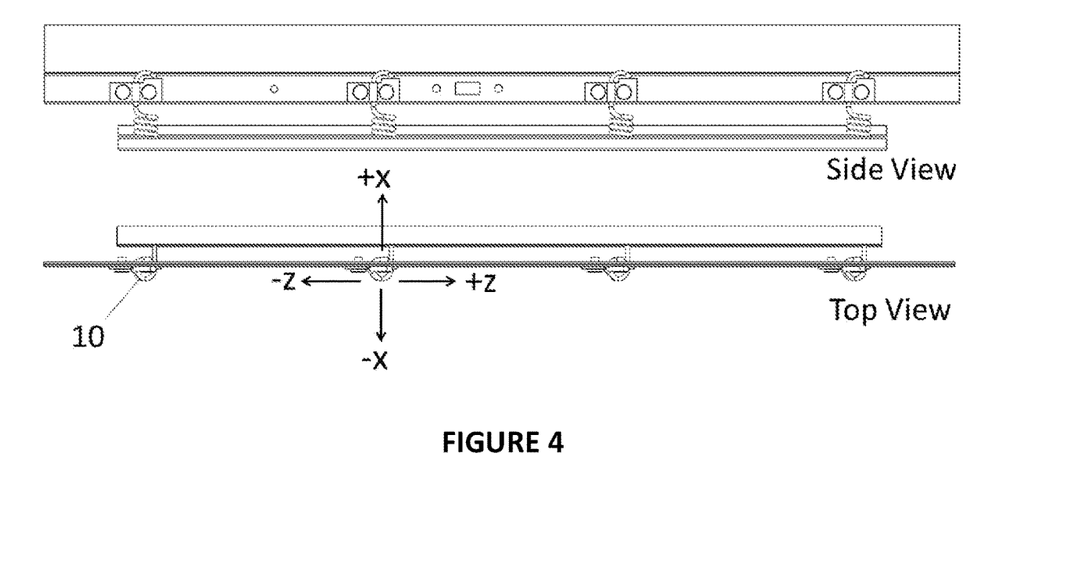
FIG. 4 shows a side view and a top view of the fan blade assembly of FIG. 2.

The blade assembly of FIG. 2 solves the CTE mismatch problem since the vertically mounted coil springs 10 are able to flex in the lateral x-z plane, as shown in FIG. 4, so as to absorb the varying dimensional expansions or contractions of the blade assembly and fan assembly subcomponents, thereby preventing any distortion or warping of these components due to their different CTE values. The x-z flexing of the springs does not interfere in any way with their functioning as the blade's pivot springs, thus allowing the fan to operate stably over any commercial operating temperature range despite potentially large CTE variations among the blade assembly and fan assembly components.

In contrast to a typical single sheet metal spring used in prior art linear fans, the wire springs of the present invention provide the following additional advantages. Due to the wire drawing process, steel wire springs have nearly twice the ultimate tensile strength and twice the fatigue limit of the highest quality sheet steels, such as flapper valve steels for example. Further, wire springs enable the commercial practicality of multiple spring leg designs since they require no edge finishing. In contrast, a multiple spring leg approach, comprising individual sheet metal springs, creates a number of edges to finish equal to two times the number of spring legs.

Figure 5:
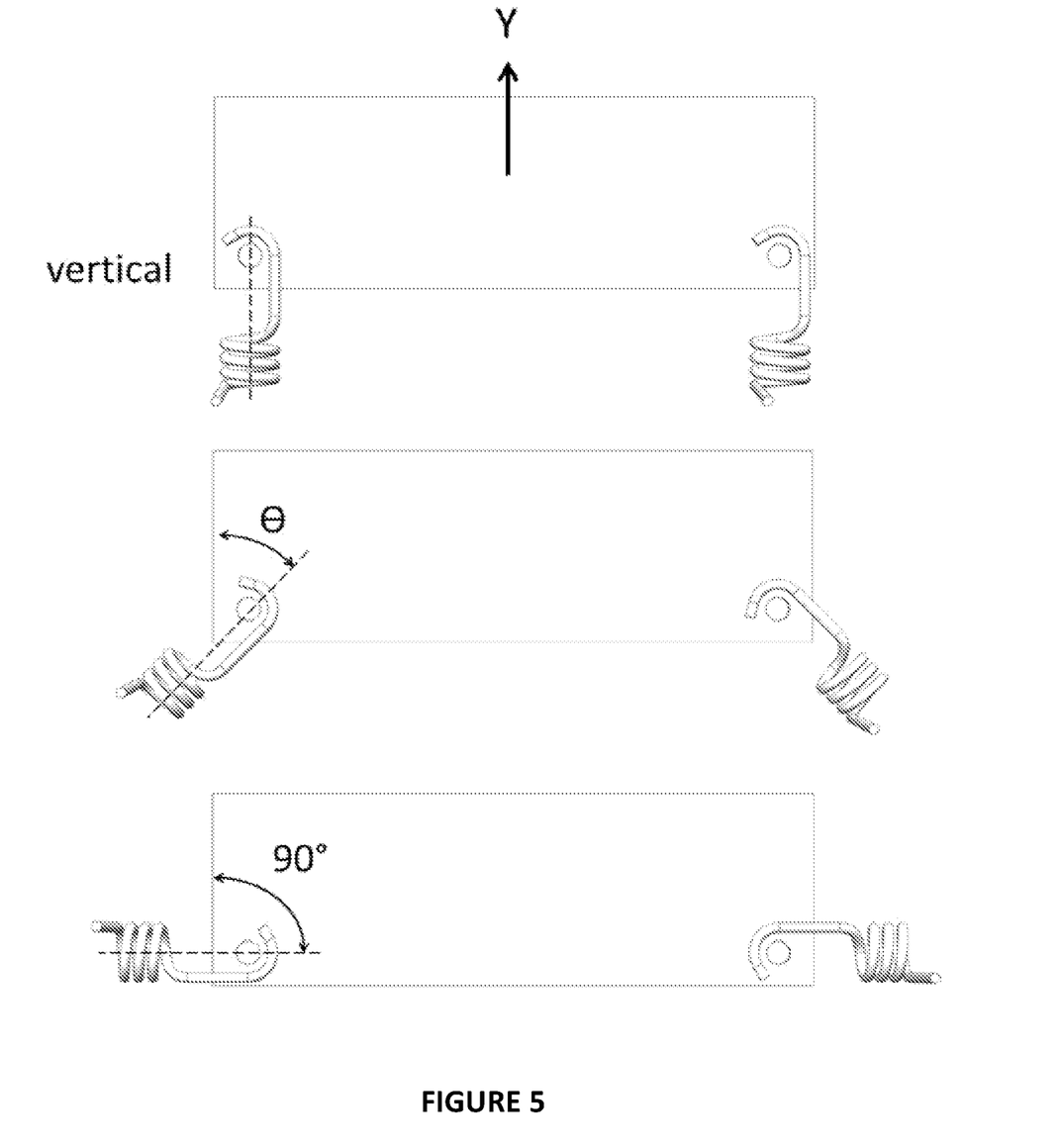
FIG. 5 shows side views of various exemplary embodiments of fan blade assemblies that include wire springs mounted at various orientations relative to a fan blade.

As illustrated in FIG. 5, since wire springs can flex in any direction, the springs can manage component CTE mismatches regardless of spring mounting angles ranging from 0° (vertical) in the lateral bending mode to 90° (horizontal) in the torsional bending mode or intermediate angles θ wherein spring deflections will comprise varying ratios of lateral and torsional bending as a function of intermediate angle θ. Thus, the fan blade assembly described herein includes embodiments with wire springs mounted at various orientations relative to the fan blade as shown in FIG. 5, for example.

Another significant advantage of the disclosed fan blade assembly is that wire springs can be shaped into many different form factors (e.g. coils) whereas sheet metal springs cannot. The additional design dimension provided by wire spring shaping can provide much higher spring stiffness K for a given peak bending stress, when compared to sheet metal springs. These higher K values and lower bending stresses enable much higher operating resonant frequencies and blade displacements and therefor much higher air flow rates and pressures. For example, the blade assemblies of FIGS. 6 and 7 were modeled with Finite Element Analysis (FEA) to compare the spring properties for the same blade 18 and same operating condition in both cases. The blade assembly of FIG. 6 comprises a 0.040 in thick and 19 in wide aluminum blade 18, four steel springs 10 having one end rigidly connected to blade 18 and the other end rigidly clamped between stationary clamp blocks 16. The blade assembly of FIG. 7 comprises a 0.004 in thick steel sheet metal spring having one end rigidly bonded to blade 18 and the other end rigidly clamped between stationary clamp blocks 22, where blade 18 of FIG. 7 is identical to blade 18 of FIG. 6. In operation the blades 18 of FIGS. 6 and 7 oscillate as indicated by the curved arrows by pivoting on their respective springs.

Figure 6:
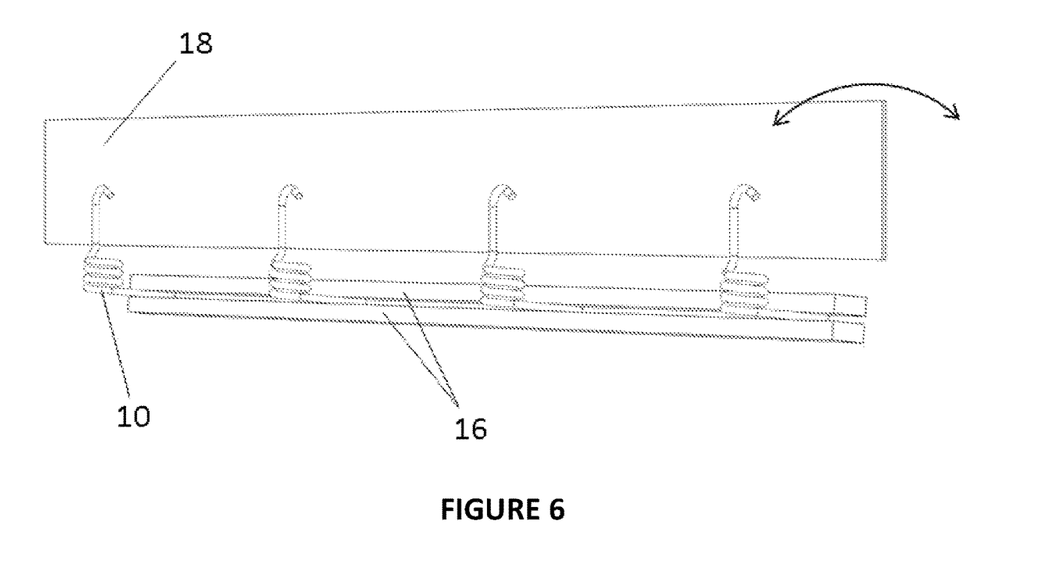
FIG. 6 is a perspective view of a fan blade assembly including wire springs.
Figure 7:
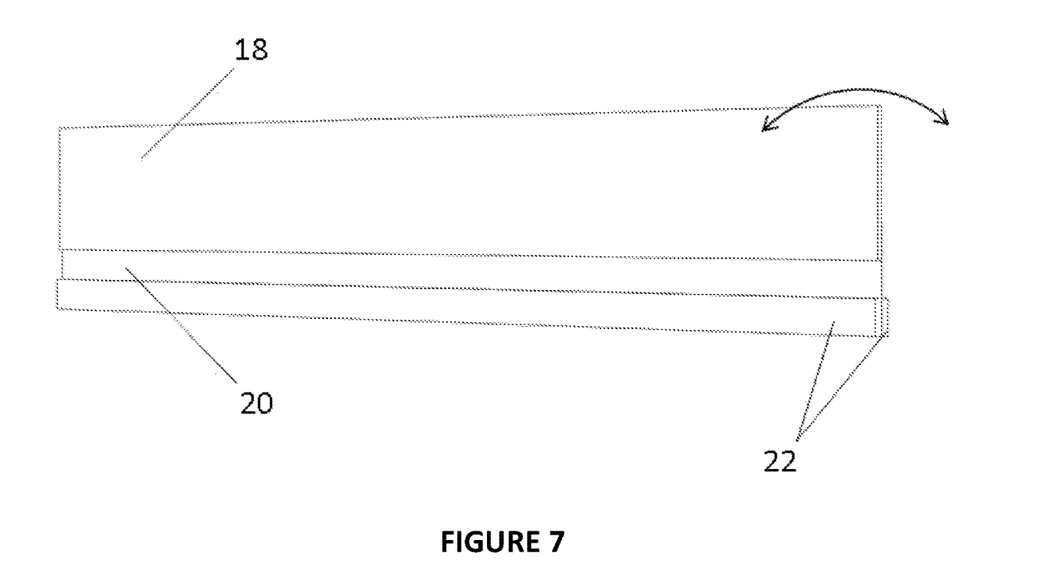
FIG. 7 is a perspective view of a fan blade assembly employing a sheet metal spring.
Figure 8:
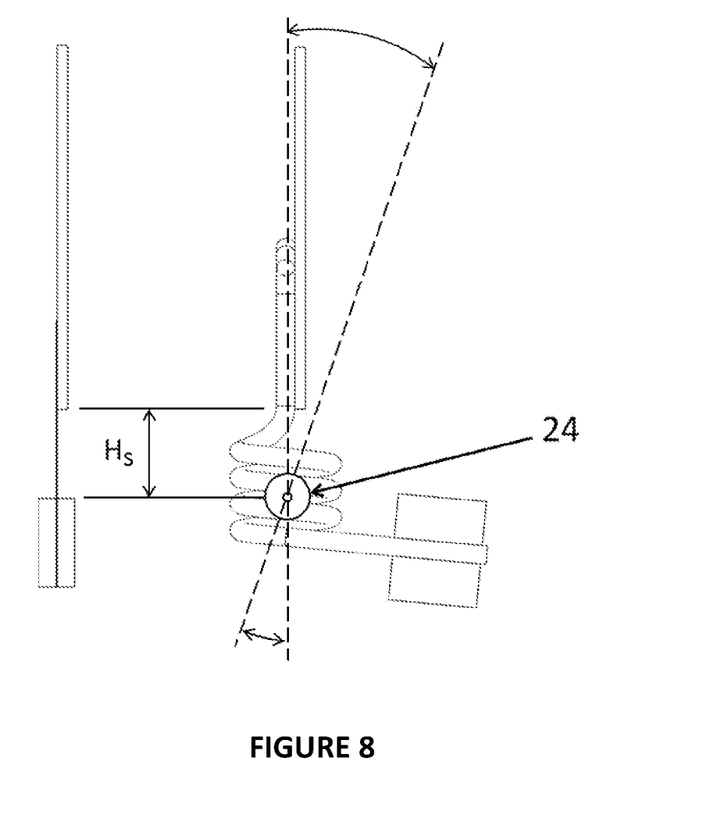
FIG. 8 is a side by side end view of the blade assemblies of FIGS. 6 and 7.

For the FEA, the blade assemblies of FIGS. 6 and 7 were designed so that their blades have equal swept volume for the same blade displacement. This equivalence requires knowing the geometrical pivot point of blade 18 in FIG. 6. FIG. 8 provides a side by side end view of the two blade assemblies of FIGS. 6 and 7 and shows that the blade pivot point 24 for the assembly of FIG. 6 is at the center of the coil spring. As illustrated in FIG. 8, to provide swept volume equivalence, the height $H_S$ of the sheet metal spring 20 must be equal to the distance from the coil spring pivot point to the base of the blade, which is 10 mm.

The FEA compared the spring stress of the FIGS. 6 and 7 blade assemblies at the same blade displacement and same operating frequency, which will result in identical air flow for both blade assemblies. Air flow rate increases with operating frequency which in turn increases with spring stiffness and spring stiffness increases with sheet metal thickness. So for the blade assembly of FIG. 7, FEA was used to find the maximum spring thickness that can be used without the peak bending stress exceeding the sheet metal fatigue limit of 700 MPa for a blade tip displacement of 8 mm. For the blade assembly of FIG. 6, coil springs were designed to provide a total spring stiffness equal to the sheet metal spring of FIG. 7 in order to match the resonant frequencies of the two blade assemblies.

As provided in the following table, FEA results show that for the same operating frequency and blade displacement, the wire coil springs have a safety factor (i.e. fatigue limit divided by peak bending stress) of 3.7 while the sheet metal spring has no safety factor, since the spring is operating at its fatigue limit.

| Model | Material | Peak Blade Displacement (mm) | Peak Bending Stress (MPa) | Resonant Frequency (Hz) | Fatigue Limit (MPa) | Saftey Factor |
|---|---|---|---|---|---|---|
| FIG. 6 (4 coil springs) | 17-7 SS | 8 | 300 | 48 | 1100 | 3.7 |
| FIG. 7 (sheet metal spring) | 717 SS Flapper Valve Steel | 8 | 700 | 46 | 700 | none |
| FIG. 6 (30 coil springs) | 17-7 SS | 8 | 300 | 131 | 1100 | 3.7 |

For a given blade assembly, air flow rates and pressures may be improved by increasing the resonant oscillating frequency, which as described above requires an increase in the spring stiffness. But for the sheet metal spring of FIG. 7, no further increases in spring stiffness can be provided since this would increase bending stress beyond the fatigue limit resulting in spring failure. In comparison, the use of wire coil springs enables more of the same springs to be added to the blade assembly of FIG. 6 for higher total spring stiffness and higher resulting operating frequencies with no increase in stress. For example, the blade assembly could accommodate 30 of the same coil springs which would increase the resonant frequency from 48 Hz to 131 Hz, providing a 2.73× increase in air flow rate and a 7.45× increase in air pressure at the same 8 mm peak displacement and due to the high fatigue limit, operating blade displacements beyond 8 mm are also possible which will provide additional increases in air flow rate. Further, the large stress safety factor allows the wire coil springs to be designed for even higher stiffness with further gains in resonant frequencies and air performance without exceeding the fatigue limit. In contrast, the sheet metal spring of FIG. 7 is certain to fail with any increase in blade displacement.

Figure 9:
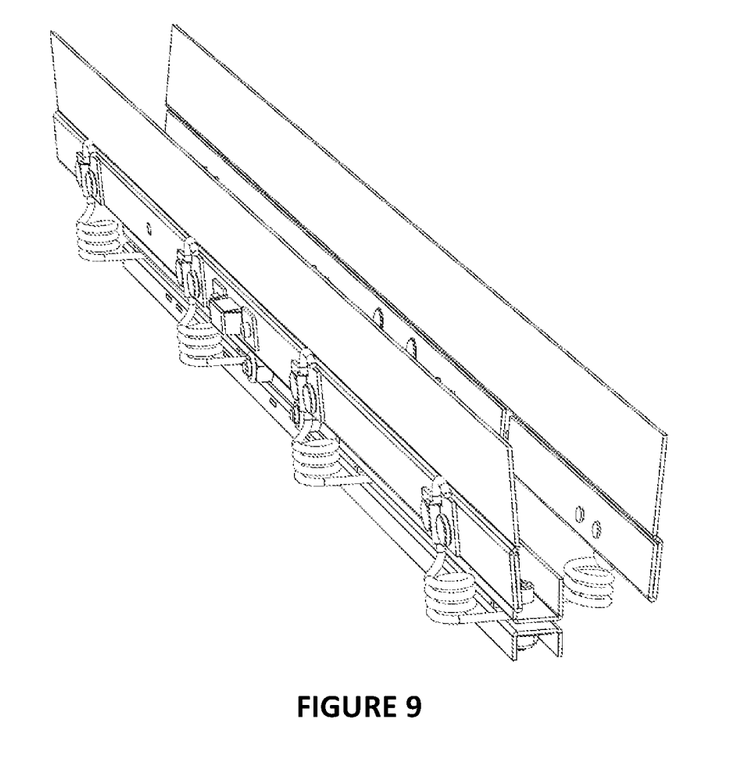
FIG. 9 is a perspective view of an exemplary embodiment of a fan blade assembly including wire springs and a plurality of fan blades.
Figure 10:
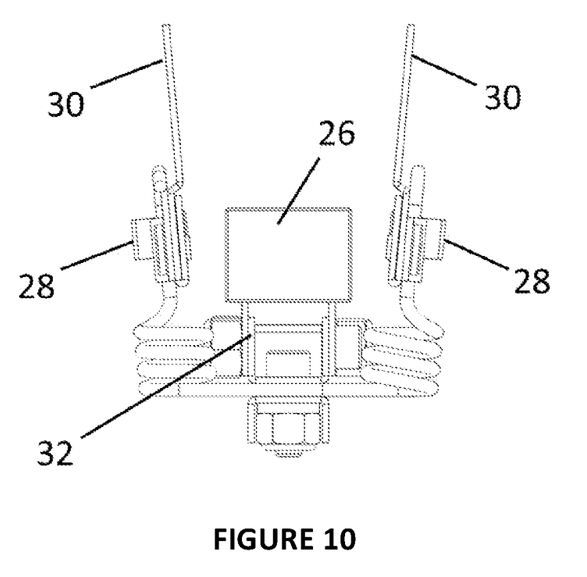
FIG. 10 is a side view of the fan blade assembly of FIG. 9.

FIG. 9, shows a two-blade linear fan developed for high power LED grow lights employing vertical wire coil springs with 19 in long fan blades. FIG. 10 provides an end view of the linear fan shown in FIG. 9. As shown in FIG. 10, the fan includes stator 26 rigidly connected to fan frame 32 and armatures 28 being rigidly connected to fan blades 30. The fan blades extend along the fan frame in parallel directions. In various embodiments, the electrically active component may be placed on either the frame or the blade and the electrically passive component would be correspondingly located on the other of the frame or the blade. In operation, stator 26 creates periodic magnetic fields resulting in periodic forces on armatures 28 such that blades 30 oscillate 180° out of phase so as to minimize fan vibration by promoting cancelation of the reaction forces that blades 30 exert onto the fan frame 32. Many different motor topologies can be used to actuate blades 30 with periodic forces and typical examples are provided in patent application PCT/US17/67658 High Performance Cantilever Fan the entire contents of which are hereby incorporated by reference herein. The fan of FIG. 9 operates at 38 Hz and delivers up to 80 CFM of air flow without exceeding the fatigue limit of the springs. The use of wire springs eliminates the CTE mismatch problem and enables stable operation of linear fans having large blade width W to blade height HB ratios. The blades of the FIG. 9 fan are 1.6 in tall and 19 in long. When using wire springs, the blade lengths can be increased indefinitely while still maintaining stable operation of the fan.

The embodiments of FIGS. 2-10 all show wire springs with a circular cross-sectional shape, but any cross-sectional shape can be used within the scope of the present invention, such as elliptical, square, rectangular or non-symmetric shapes as long as the wire has no sharp edges that create stress risers leading to premature spring failure. Wire cross sectional area, total wire spring length, spring material and spring form factor are all chosen to satisfy the requirements of a given application which will be well known to one skilled in the art.

Figure 11:
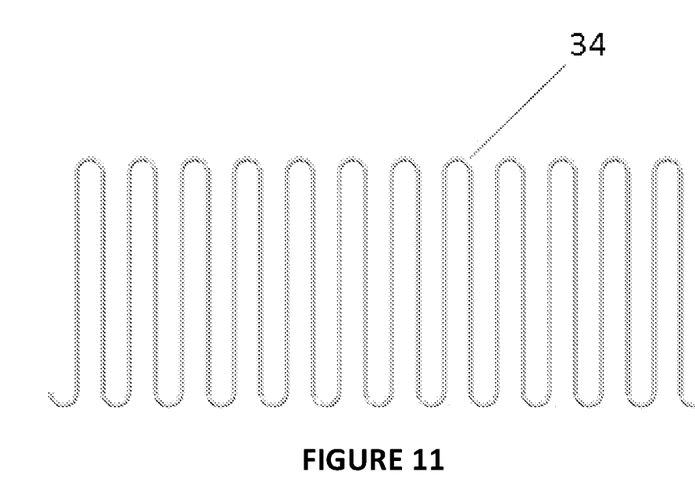
FIG. 11 is a perspective view of an exemplary embodiment of a wire spring for use with a fan blade.
Figure 12:
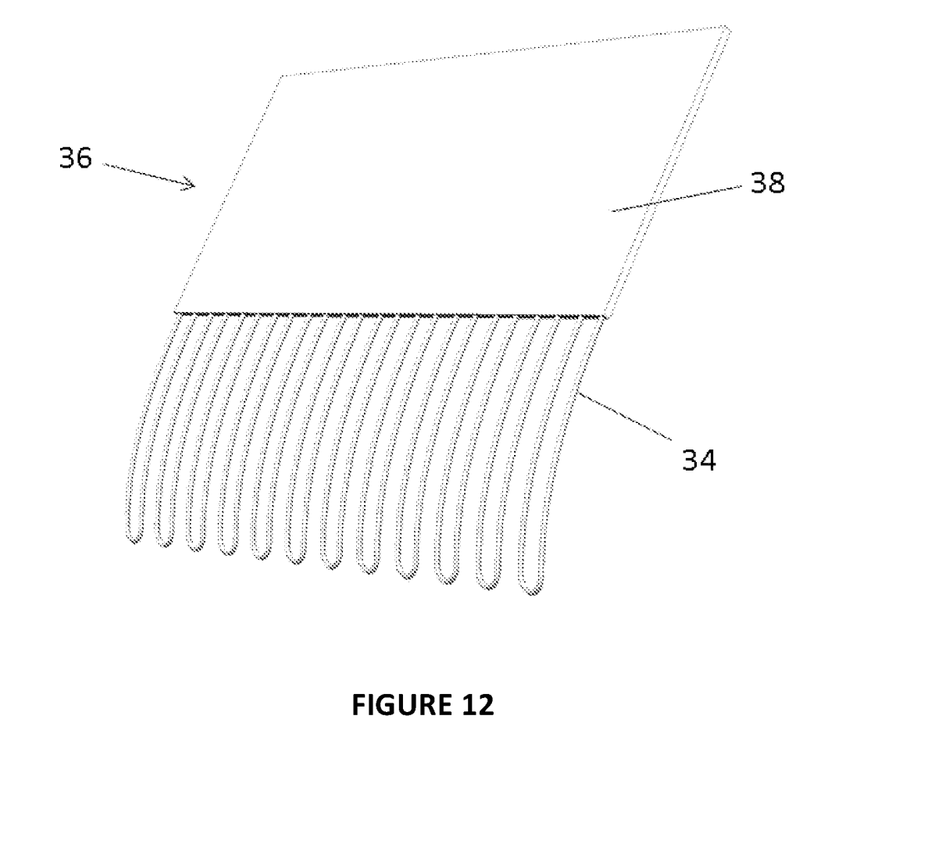
FIG. 12 is a perspective view of the wire spring of FIG. 11 connected to an exemplary fan blade.

The embodiments of FIGS. 2-10 all show wire springs wound in a coil form factor with attachment legs on each end of the spring. Wire springs within the scope of the present invention can also be wound in any number of spring form factors. FIG. 11 provides a further example of wound wire spring form factors, where spring wire is wound to form a planar spring 34. The exemplary spring shown in FIG. 11 is wound in a zig-zag or serpentine shape, with the spring rotated so that the parallel lengths of the longer portions of the wire extend between the fan blade and the fan frame with the shorter portions connected to either the fan blade or the fan frame. As shown in an exemplary blade assembly 36 depicted in FIG. 12, the bottom edge of blade 38 is rigidly attached to the top of spring 34 with spring 34 being shown in the deflected state seen during fan operation when the bottom of spring 34 is rigidly clamped to remain stationary. Methods of fastening springs to blades include clamp blocks, screws, rivets or insertion molding of plastic blades as suggested in FIG. 11. FEA of the FIG. 12 blade assembly shows a 47.7 Hz resonant frequency, a stress safety factor of 2.3 at a blade tip displacement from rest of 9 mm. The blade height $H_B$, thickness and material were the same as blade 18 of FIGS. 6 and 7.

Wire springs can be formed into an endless number of shapes and form factors within the scope of the present invention but regardless of these various application-dependent wire spring designs they will all provide the benefits of the present invention which include eliminating the CTE mismatch problem associated with sheet metal springs, providing much higher spring fatigue limits due to the wire drawing process and eliminating the life and reliability issues associated with edge finishing of sheet metal springs.

For linear fans with blades that pivot on springs, the oscillation frequency of the blade will be at or near the mass-spring resonance of the blade assembly for maximum fan energy efficiency. The resonance frequency may be tuned by adjusting the stiffness K of the coil springs with parameters such as coil diameter, wire diameter and pitch and also by adjusting the mass of the blade. Permanent magnet springs may also be added in addition to the coil springs to further increase the blade assembly's effective spring K so as to provide higher resonant frequencies and higher air flow and pressure as taught in patent application PCT/US17/67658 High Performance Cantilever Fan the entire contents of which are hereby incorporated by reference herein.

What is claimed is:
1. A linear fan comprising:
    a wire spring having a first end attached to a fan blade and a second end attached to a fan frame;
    wherein the fan blade includes a free end;
    wherein the blade oscillates and wherein the maximum displacement of the blade occurs at the free end;
    wherein the wire spring and the blade are connected in a manner so that the spring must bend in order for displacement of the blade to occur;

wherein the wire spring is oriented to bend dominantly in a lateral bending mode in a direction corresponding to the displacement direction of the blade; and a motor for driving the oscillation of the fan blade.

2. The linear fan of claim 1, wherein the wire spring is configured as at least one coil spring and includes a pitch sufficient to ensure that the spring coils do not make contact with each other during lateral bending of the coil spring.

3. The linear fan of claim 1, wherein the wire spring is configured as at least one planar spring.

4. The linear fan claim 1, further comprising:
a second fan blade;
a second wire spring having a first end attached to a second fan blade and a second end attached to the fan frame;
wherein the second fan blade includes a free end;
wherein the blade oscillates and wherein the maximum displacement of the second blade occurs at the free end;
wherein the second wire spring and the second blade are connected in a manner so that the second wire spring must bend in order for displacement of the second fan blade to occur;
wherein the second wire spring is oriented to bend dominantly in a lateral bending mode in a direction corresponding to the displacement direction of the second blade;
wherein the motor drives the oscillation of the second fan blade;
wherein the first and second blades oscillate 180 degrees out of phase so as to promote cancelation of reaction forces exerted by each of the blades on the fan frame.

5. The linear fan of claim 4, wherein the second wire spring is configured as at least one coil spring.

6. The linear fan of claim 4, wherein the second wire spring is configured as at least one planar spring.

7. The linear fan of claim 1, wherein the motor includes a stator mounted to the frame and an armature mounted to the fan blade.

8. The linear fan of claim 1, wherein the blade width W is larger than the blade height $H_B$.

9. The linear fan blade assembly of claim 8, where in the blade width W is greater than ten times the blade height $H_B$.

10. The fan of claim 1, where in the motor drives the fan at its mass-spring mechanical resonance.

11. The fan of claim 1, where the wire spring is designed to operate below the fatigue limit of the wire spring.

12. A linear fan comprising:
a first wire spring having a first end attached to a first fan blade and a second end attached to a fan frame;
wherein the first fan blade oscillates and includes a free end and the maximum displacement of the first fan blade occurs at the free end;
the first wire spring being vertically oriented with respect to the plane of the blade and wherein the first wire spring bends primarily in a lateral mode to thereby enable the fan blade to oscillate;

a second wire spring having a first end attached to a second fan blade and a second end attached to the fan frame;
wherein the second fan blade includes a free end and the maximum displacement of the second fan blade occurs at the free end;
the second wire spring being vertically oriented with respect to the plane of the blade and wherein the second wire spring bends primarily in a lateral mode to thereby enable the second fan blade to oscillate;
a motor having a stator attached to the fan frame, a first armature attached to the first fan blade and a second armature attached to the second fan blade, where in the stator applies time-varying forces to the first and second armatures causing the first and second blades to oscillate.

13. The fan of claim 12, wherein the time varying forces of the motor cause the first and second blades to oscillate 180 degrees out of phase so as to promote cancelation of the reaction forces of the first and second blades on the fan frame.

14. The fan of claim 12, wherein the first and second springs are coil springs.

15. The fan of claim 12, wherein the first and second springs are planar springs.

16. The fan of claim 12, wherein the blade width W is larger than the blade height HB.

17. The fan of claim 12, wherein the blade width W is greater than 10 times the blade height HB.

18. The fan of claim 12, where in the motor drives the fan at its mass-spring mechanical resonance.

19. The fan of claim 12, where the wire spring is designed to operate below the fatigue limit of the wire spring.

20. A linear fan comprising:
a motor for driving a first fan blade and a second fan blade;
a fan frame a first wire spring connected at a first end to the first fan blade and at a second end to the fan frame;
a second wire spring connected at a first end to the second fan blade and at a second end to the fan frame;
wherein each of the first and second wire springs are oriented to bend primarily in a lateral bending mode in a direction corresponding to the displacement direction of the first and second fan blades, and wherein each of the wire springs bends to thereby allow the fan blades to oscillate;
wherein each of the first and second fan blades includes a free end, and wherein the maximum displacement of each of the fan blades occurs at the free end;
wherein the motor includes: a stator connected to the fan frame, a first armature attached to the first fan blade and a second armature attached to the second fan blade.

21. The linear fan of claim 20, wherein each of the first and second wire springs are vertically oriented with respect to the plane of the first and second fan blades.

* * * * *